Patented June 23, 1953

2,643,243

UNITED STATES PATENT OFFICE 2,643,243

CURING GLYCIDYL POLYETHERS OF DIHYDRIC PHENOLS WITH SULFONIC ACIDS

Hans Dannenberg, Berkeley, Calif., assignor to Shell Development Company, Emeryville, Calif., a corporation of Delaware No Drawing. Application February 26, 1951, Serial No. 212,831

15 Claims. (Cl. 260—49)

This invention relates to a process of resinifying and curing glycidyl polyether of a dihydric phenol with an organic sulfonic acid or the corresponding acid halide, and to the resulting solid resinous product.

Glycidyl polyethers of dihydric phenols have been cured heretofore with the aid of polycarboxylic acid anhydrides or organic polyamines, which substances function as curing agents for the polyethers. Although resinous products are obtainable with use of such curing agents, it is generally necessary, in order to obtain a tight cure, that relatively large proportions of the curing agent be admixed with the polyether and that the mixture be heated or baked to complete the cure. The large proportions of prior curing agents have been required in obtaining the tight or complete cure because the curing agents function as reactants with the polyethers and, consequently, approximately equivalent amounts of the acid anhydride or polyamine are necessary, i. e., such proportions that the mixture contains about one carboxylic acid or amino group for each epoxy group in the polyether. As a result of using the large proportions of curing agent, the resinous products are lacking in desired properties, since the use of polycarboxylic acid anhydrides results in products with poor water and alkali resistance, and the use of polyamines gives products with poor stability against discoloration.

It has now been discovered that glycidyl polyethers of dihydric phenols are effectively cured to solid resinous products having excellent properties by commingling therewith relatively small proportions of a special class of organic sulfonic acids or the corresponding sulfonic acid halides. The new curing agents effect the resinification primarily by catalytic action and, consequently, only small amounts are needed to effect complete cure of the polyethers. Furthermore, a certain class of the new curing agents enable a tight cure to be obtained at ordinary room or atmospheric temperature without necessity of heating the resin-forming mixture. Curing at elevated temperatures may be used, if desired.

In brief, the present invention is the process of resinifying glycidyl polyether of a dihydric phenol having a 1,2-epoxy equivalency greater than 1.0 by commingling the polyether with 0.1% to 5% by weight of a sulfonic acid or sulfonyl halide which is a substituted hydrocarbon free of other substituent groups than 1 to 3 single members of the class consisting of sulfonic acid and sulfonyl halide groups, and permitting the resulting mixture to resinify and cure to a solid resinous product. The curing agent employed in the process of the invention contains only the sulfonic acid or sulfonyl halide group linked to the hydrocarbon because the presence of other functional groups, such as amino, defeats the primary object of the invention which is the process of enabling essentially catalytic, fast, complete cure of the glycidyl polyether.

While the curing of the glycidyl polether may be effected with substances containing 1 to 3 sulfonic groups linked to the otherwise unsubstituted hydrocarbon radical, it was found that the behavior of the aromatic polysulfonic acids or halides in the process is quite different from the mono-substituted compounds. In fact, the difference is so great, as will be explained fully hereinafter, that the use of the aromatic polysulfonic acid compounds in the process is preferred.

The glycidyl polyether of a dihydric phenol employed as resin-forming material in the process of the invention is obtainable by reacting epichlorhydrin with a dihydric phenol in alkaline medium. The polyethers are prepared by heating the dihydric phenol with epichlorhydrin at about 50° C. to 150° C. using 1 to 2 or more mols of epichlorhydrin per mol of dihydric phenol. Also present is a base, such as sodium or potassium hydroxide in slight stoichiometric excess to the epichlorhydrin, i. e., about 2% to 30%. The heating is continued for several hours to effect the reaction and the product is then washed free of salt and base. The product, instead of being a single simple compound, is generally a complex mixture of glycidyl polyethers, but the principal product may be represented by the formula

where $n$ is an integer of the series $0, 1, 2, 3 \ldots$, and R represents the divalent hydrocarbon radical of the dihydric phenol. While for any single molecule of the polyether $n$ is an integer, the fact that the obtained polyether is a mixture of compounds causes the determined value for $n$, e. g., from molecular weight measurement, to be an average which is not necessarily zero or a whole number. Although the polyether is a substance primarily of the above formula, it may contain some material with one or both of the terminal glycidyl radicals in hydrated form.

The simplest polyether is a diglycidyl diether of the dihydric phenol which contains a single divalent aromatic hydrocarbon radical from the dihydric phenol and has two glycidyl radicals linked thereto by ethereal oxygen atoms. More generally, the polyether is of more complex character and contains two or more aromatic hydrocarbon radicals alternating with glyceryl groups in a chain which are linked together by intervening ethereal oxygen atoms.

The glycidyl polyethers of a dihydric phenol used in the invention have a 1,2-epoxy equivalency greater than 1.0. By the epoxy equivalency reference is made to the average number of 1,2-epoxy groups

contained in the average molecule of the glycidyl ether. Owing to the method of preparation of the glycidyl polyethers and the fact that they are ordinarily a mixture of chemical compounds having somewhat different molecular weights and contain some compounds wherein the terminal glycidyl radicals are in hydrated form, the epoxy equivalency of the product is not necessarily the integer 2. However, in all cases it is a value greater than 1.0. The 1,2-epoxy equivalency of the polyethers is thus a value between 1.0 and 2.0.

The 1,2-epoxide value of the glycidyl polyether is determined by heating a weighed sample of the ether with an excess of 0.2N pyridinium chloride in chloroform solution at the boiling point under reflux for 2 hours whereby the pyridinium chloride hydrochlorinates the epoxy groups to chlorhydrin groups. After cooling, the excess pyridinium chloride is back-titrated with 0.1N sodium hydroxide in methanol to the phenol-phthalein end point. This method is used for obtaining all epoxide values discussed herein.

Any of the various dihydric phenols is used in preparing the polyethers including mononuclear phenols such as resorcinol, catechol, hydroquinone, methyl resorcinol, etc.; or polynuclear phenols like 2,2-bis(4-hydroxyphenyl)-propane which is termed bis-phenol herein for convenience, 4,4'-dihydroxybenzophenone, bis-(4-hydroxyphenyl)methane, 1,1-bis(4-hydroxyphenyl)ethane, 1,1-bis(4-hydroxyphenyl)isobutane, 2,2-bis(4-hydroxyphenyl)butane, 2,2-bis-(4-hydroxy-2-methylphenyl)propane, 2,2-bis(4-hydroxy - 2 - tertiary - butylphenyl) - propane, 2,2-bis(2-hydroxynaphthyl)pentane, 1,5-dihydroxynaphthalene, etc.

Preferred polyethers used in the process are prepared from 2,2-bis(4-hydroxyphenyl)propane. They contain a chain of alternating glyceryl and 2,2-bis(4-phenylene)propane radicals separated by intervening ethereal oxygen atoms, have a 1,2-epoxy equivalency between 1.0 and 2.0, and have a molecular weight of about 1200 to 4000. More generally, it is preferred to employ glycidyl polyether of a dihydric phenol which has a value for $n$ in the above-mentioned structural formula of about 6 to 15.

The glycidyl polyethers will be more fully understood from consideration of the following described preparations and the properties of the products.

Polyether A

Glycidyl polyethers of a dihydric phenol having lowest molecular weight, i. e., $n$ approaching or equaling zero, are best prepared by reacting the dihydric phenol and base with epichlorhydrin in the presence of a large excess of epichlorhydrin such as at least 5 mols of epichlorhydrin per mol of the phenol.

Bis-phenol is dissolved in epichlorhydrin in the proportion of 5,130 parts (22.5 mols) of bis-phenol in 20,812 parts (225 mols) of epichlorhydrin and 104 parts of water. The solution is prepared in a kettle provided with heating and cooling equipment, agitator, distillation condenser and receiver. A total of 1880 parts of solid 97.5% sodium hydroxide, corresponding to 2.04 mols of sodium hydroxide per mol of bis-phenol (2% excess) is added in installments. The first installment of 300 parts of sodium hydroxide is added and the mixture heated with efficient agitation. The heating is discontinued as the temperature reaches 80° C. and cooling is started in order to remove the exothermic heat of reaction. The control is such that the temperature rises only to about 100° C. When the exothermic reaction has ceased and the temperature has fallen to 97° C., a further addition of 316 parts of sodium hydroxide is made and similar further additions are effected at successive intervals. An exothermic reaction takes place after each addition. Sufficient cooling is applied so there is gentle distillation of epichlorhydrin and water, but the temperature is not allowed to go below about 95° C. No cooling is necessary after the final addition of sodium hydroxide. After the last addition of sodium hydroxide with completion of the reaction, the excess epichlorhydrin is removed by vacuum distillation with use of a kettle temperature up to 150° C. and a pressure of 50 mm. Hg. After completion of the distillation, the residue is cooled to about 90° C. and about 360 parts of benzene added. Cooling drops the temperature of the mixture to about 40° C. with precipitation of salt from the solution. The salt is removed by filtration and the removed salt carefully washed with about an additional 360 parts of benzene to remove polyether therefrom. The two benzene solutions are combined and distilled to separate the benzene. When the kettle temperature reaches 125° C., vacuum is applied and distillation continued to a kettle temperature of 170° C. at 25 mm. pressure. The resulting glycidyl polyether of bis-phenol has a Durrans' Mercury Method softening point of 9° C., an average molecular weight of 355 by ebullioscopic measurement in ethylene dichloride, and an epoxide value of 0.52 equivalents epoxy per 100 grams. The product is designated hereinafter as Polyether A.

Polyether B

Polyethers of higher molecular weight are prepared by using smaller ratios of epichlorhydrin to bis-phenol. In a vessel fitted with an agitator, 228 parts (1 mol) of bis-phenol and 75 parts (1.88 mols) sodium hydroxide as a 10% aqueous solution are introduced and heated to about 45° C. whereupon 145 parts (1.57 mols) of epichlorhydrin are added rapidly while agitating the mixture. The temperature of the mixture is then gradually increased and maintained at about 95° C. for 80 minutes. The mixture separates into a two-phase system and the aqueous layer is drawn off from the taffy-like product which forms. The latter is washed with hot water while molten until the wash water is neutral to litmus. The product is then drained and dried by heating to a final temperature of 130° C. The softening point of the resulting glycidyl polyether is 69° C. The measured molecular weight of the product is 900 and it has an epoxide value of 0.20 equivalents epoxy per 100 grams. It will be identified hereinafter as Polyether B.

Polyether C

This glycidyl polyether is prepared in like manner to that of Polyether B except that for each mol of bis-phenol there is employed 1.22 mols of epichlorhydrin and 1.37 mols of sodium hydroxide. The resulting polyether has a softening point of 98° C. by Durrans' Mercury Method, a molecular weight of 1400 as measured ebullioscopically in ethylene dichloride, and an epoxide value of 0.103 equivalents epoxy per 100 grams.

*Polyether D*

Glycidyl polyethers of still higher molecular weight are most easily prepared by heating together and reacting a lower polyether with additional dihydric phenol. 100 parts of polyether C are heated to 150° C., and then 5 parts of bis-phenol are added. The heating is continued for about two hours while stirring the reaction mass and gradually increasing the temperature to about 200° C. The resulting product has a softening point of 131° C., a molecular weight of 2900, and an epoxide value of 0.05 equivalents epoxy per 100 grams.

*Polyether E*

This polyether is prepared as described for Polyether D except that the 100 parts of Polyether C are mixed, heated and reacted with 7.75 parts of bis-phenol. The resulting product has a softening point of 156° C., a molecular weight of 3750, and an epoxide value of 0.036 equivalents epoxy per 100 grams.

The properties of the foregoing polyethers are summarized in the following table:

| Polyether | Softening Point, °C. | Mol. Wt. | $n$ | Epoxy Value, eq./100 g. | 1,2-Epoxy Equivalency |
|---|---|---|---|---|---|
| A | 9 | 355 | 0.05 | 0.52 | 1.85 |
| B | 69 | 900 | 1.97 | 0.20 | 1.80 |
| C | 98 | 1,400 | 3.74 | 0.103 | 1.46 |
| D | 131 | 2,900 | 9.02 | 0.05 | 1.45 |
| E | 156 | 3,750 | 12.00 | 0.036 | 1.40 |

The organic sulfonic acids or sulfonyl halides employed as catalyzing curing agents in the invention have the sulfonic acid or sulfonyl halide group or groups linked to aliphatic, aromatic, or alicyclic hydrocarbon radicals which are otherwise free of functional substituent groups. They include, for example, aliphatic monosulfonic acids such as methanesulfonic acid, ethanesulfonic acid, propane-1-sulfonic acid, propane-2-sulfonic acid, butane-1-sulfonic acid, 2-methylpropane-1-sulfonic acid, butane-2-sulfonic acid, hexane-1-sulfonic acid, decane-1-sulfonic acid, dodecane-1-sulfonic acid, hexadecane-1-sulfonic acid, ethenesulfonic acid, propene-2-sulfonic acid, 2-methylpropene-3-sulfonic acid, and diisobutylenesulfonic acid; the aliphatic polysulfonic acids such as methanedisulfonic acid, ethane-1,1-disulfonic acid, ethane-1,2-disulfonic acid, 2-methylpropane-1,2-disulfonic acid, methanetrisulfonic acid, and ethane-1,1,2-trisulfonic acid; the aromatic monosulfonic acids, such as benzenesulfonic acid, o-toluene sulfonic acid, m-toluenesulfonic acid, p-toluenesulfonic acid, 2,4-dimethylsulfonic acid, naphthalene-1-sulfonic acid, naphthalene-2-sulfonic acid, 2,4,5-trimethylsulfonic acid, benzylsulfonic acid, phenylethanesulfonic acid, 1-phenylethene-2-sulfonic acid, mesitylenesulfonic acid, and m-cymenesulfonic acid; the aromatic polysulfonic acids such as m-benzenedisulfonic acid, p-benzenedisulfonic acid, benzene-1,3,5-trisulfonic acid, and toluene-2,4-disulfonic acid; and the alicyclic sulfonic acids such as cyclopentanesulfonic acid and cyclohexanesulfonic acid, as well as the corresponding sulfonyl halides such as methanesulfonyl chloride, methanesulfonyl bromide, ethanesulfonyl chloride, ethanesulfonyl bromide, propane-1-sulfonyl chloride, butane-1-sulfonyl chloride, 2-methylpropane-1-sulfonyl chloride, propene-2-sulfonyl chloride, methanedisulfonyl chloride, ethane-1,2-disulfonyl chloride, propane-1,2-disulfonyl chloride, benzenesulfonyl fluoride, benzenesulfonyl chloride, benzenesulfonyl bromide, benzenesulfonyl iodide, o-toluenesulfonyl chloride, p-toluenesulfonyl chloride, p-toluenesulfonyl bromide, naphthalene-2-sulfonyl chloride, benzylsulfonyl chloride, m-benzenesulfonyl chloride, cyclopentanesulfonyl chloride, and cyclohexanesulfonyl chloride.

The curing of the glycidyl polyether is effected by admixing and commingling about 0.1% to 5% by weight of the sulfonic acid or sulfonyl halide with the polyether. Curing of the glycidyl polyethehr begins immediately upon the mixing. While the curing may run to completion at ordinary atmospheric temperature of about 15° C. to 40° C., it is generally preferred to employ elevated temperatures in order to effect the cure at a more rapid rate. For more practical rates of cure, a temperature of about 100° C. to 250° C. is employed.

Quite unexpectedly it was found that very rapid rates of cure are realized with aromatic polysulfonic acids. In fact, the rate of cure with these acids is so rapid, especially when about 2% to 5% is used, that special procedures are best used in their application. Furthermore, they give a rapid rate of cure even at ordinary temperature. In using the aromatic polysulfonic acids as curing catalysts for the glycidyl polyether in surface coating applications, it is most feasible not to first mix the acid with the polyether and then apply the mixture by spraying or brushing, but rather to form the mixture in the spraying operation. This is because the aromatic polysulfonic acid will cause gelation of the polyether so soon that application of the mixture before gelation occurs is not very feasible when customary methods of application are used. Especially for surface-coating uses, a better method of application is to spray a solution of the glycidyl polyether from an air-operated gun which is constructed so that a solution of the aromatic sulfonic acid separately enters and mixes with the polyether in the zone of atomization. In this way, the curing agent is thoroughly mixed with the polyether in the zone of atomization and the mixture is immediately impinged on the surface desired to be coated. Since spray gun coating operations almost invariably involve intermittent operation of the gun, there is no danger of the gun becoming clogged or plugged when constructed in the manner indicated. An excellent example of a suitable two nozzle gun is described and shown in British Patent No. 566,543.

The percentage of curing catalyst employed with the glycidyl polyether is quite critical. When about 0.1% to 5% of sulfonic acid or the corresponding halide is employed, the resulting cured resinous product is hard and tough, and has outstanding resistance against the deteriorating and destructive action of alkalies. The cured resinous products of the invention are thus of great value as surface coating films for protection of metal surfaces which come into contact with alkaline materials such as soapy water as is the case with washing machines. If more than about 5% of curing catalyst is used, the alkali resistance of the cured product decreases very rapidly and if still larger proportions are employed the product will not cure to a product insoluble in organic solvents. The use of the sulfonic acids or halides in amounts of 0.1% to 5% with proper time and temperature for completion of the cure gives a resinous product having a very tight cure and insolubility in all non-destructive organic solvents such as methyl ethyl ketone, for example. A more preferred range of catalyst concentration is from about 0.5% to 3%.

Although not essential, it is generally preferred to effect the mixing of the curing catalyst and the glycidyl polyether with the latter dissolved in a solvent. The glycidyl polyethers of a dihydric phenol are soluble in a variety of solvents including ketones, such as acetone, methyl ethyl ketone, methyl isobutyl ketone, isophorone, etc.; esters, such as ethyl acetate, butyl acetate, Cellosolve acetate (ethylene glycol monoacetate), etc.; ether alcohols, such as methyl, ethyl or butyl ether of ethylene glycol or diethylene glycol; and chlorinated solvents, such as trichloropropane, chloroform, etc. To save expense, these active solvents are ordinarily used in admixture with diluents which are themselves not solvents when used alone, but which may be incorporated with active solvents. Reference is made to aromatic hydrocarbons, such as benzene, toluene, xylene, aromatic petroleum thinner, etc.; and alcohols such as ethyl, isopropyl and n-butyl alcohol. In order to achieve desired evaporation and drying characteristics, the solvents are combined and balanced for desired properties in the manner well known in the lacquer and varnish arts. Typical solvent combinations are illustrated in examples given hereinafter. It is also often convenient to add the curing catalyst as a solution in an organic solvent such as esters like ethyl acetate, n-butyl acetate, or Cellosolve acetate; alcohols such as ethanol and n-butanol; or ketones such as acetone or methyl ethyl ketone; as well as mixtures of two or more of such liquid compounds.

When used as film-forming materials, the compositions containing the glycidyl polyether and curing catalyst may contain various other materials such as pigments, plasticizers, and other resins. Pigments such as titanium dioxide, antimony oxide, lead oxide, carbon black, chrome yellow, zinc oxide, para red, and the like, are used in the compositions. Best results in preparing enamels are obtained by grinding the pigment with a portion of the solvent and glycidyl polyether and then adding the remainder of the solvent and glycidyl polyether after the grinding operation. The enamel is ready for application after addition of the curing catalyst.

With either varnishes or enamels of the invention, thick layers of the film-forming material may be applied to a surface such as metal, wood, or the like. Curing completely therethrough is attained because the conversion to an insoluble film is not dependent upon contact with air. This fact also makes the compositions valuable in manufacture of laminates wherein the laminae are cloth, paper, glass-cloth, and the like. Such laminae are impregnated with a solution of the glycidyl polyether and curing catalyst. After drying, the impregnated sheets are stacked and cure is effected in a heated press.

Many of the compositions are also suitable for molding operations wherein they are introduced into a mold, compressed and cure completed with heat. Various fillers, dyes and pigments may be incorporated with the compositions in use for molding operations such as wood flour, talc, alpha-cellulose, zinc sulfide, etc.

The following examples are given to illustrate typical embodiments of the invention, but are not limitative thereof. The parts are by weight.

EXAMPLE I

A solution was prepared consisting of 37.5 parts of Polyether E in 15.7 parts of Cellosolve acetate (ethylene glycol monoacetate), 28.1 parts of methyl isobutyl ketone, and 18.7 parts of toluene. The glycidyl polyether was admixed with m-benzenedisulfonic acid as curing catalyst, and the mixture applied and tested as a surface coating on panels of glass and sheet steel. Since the curing catalyst was an aromatic polysulfonic acid having the very rapid rate of cure, the coatings were applied with a special spray gun constructed substantially as described and shown in British Patent No. 566,543, whereby the polyether was commingled with the catalyst in the zone of atomization after solutions of each had left separate nozzles of the gun. Films with different proportions of catalyst were obtained by using catalyst solutions of different concentrations as feed for the gun.

A film was obtained by spraying the above-noted polyether solution with use of a solution of 15% m-benzenedisulfonic acid in n-butyl acetate. This gave a film containing 2.8% by weight of the sulfonic acid on basis of the polyether. The applied film was allowed to dry and cure at 77° F. under 50% humidity. The excellent resulting film was very resistant to alkali in that it was unchanged after being in contact with covered drops (to avoid evaporation) of 15% aqueous sodium hydroxide solution for 48 hours.

Another film was similarly prepared which contained 0.33% of m-benzenedisulfonic acid on basis of the polyether by use of a 10% solution of the polysulfonic acid in n-butyl acetate. The resulting dried and cured film likewise was unchanged after contact with the alkali solution for 48 hours.

A third film was prepared in like manner except that the polyether solution contained only 30 parts of Polyether E together with 7.5 parts of chlorinated diphenyl (Aroclor 1254) having a density of 1.54 and a boiling range of about 365° C. to 390° C. A solution of 10% m-benzenedisulfonic acid in n-butyl acetate was used with the spray gun so that the film contained 0.74% of the polysulfonic acid on basis of the total amount of polyether and chlorinated diphenyl. The resulting dried and cured film was also unchanged after contact with the alkali for 48 hours.

Curing of a glycidyl polyether at elevated temperatures after admixture with a sulfonic acid will be illustrated in the next examples.

EXAMPLE II

A stock solution of 37.5 parts of Polyether D in 15.7 parts of Cellosolve acetate (ethylene glycol monoacetate), 28.1 parts of methyl isobutyl ketone, and 18.7 parts of toluene was prepared. A catalyst solution was also prepared containing 20% m-benzenedisulfonic acid in n-butyl acetate. Various proportions of catalyst solution were mixed with separate portions of the polyether stock solution to give film-forming compositions containing varying percentages of catalyst as stated below. Sheet steel test panels were dipped in the solutions for application of a film of identical and uniform thickness. The dipped sheets were allowed to dry briefly by evaporation and then placed in an air oven where they were baked for one-half hour at temperatures indicated below.

Based upon the amount of the polyether, the filmforming compositions contained 0.5, 1.0 and 2.0% of m-benzene-disulfonic acid. The composition containing 2.0% catalyst gelled in a few minutes after preparation owing to the powerful action of the polysulfonic acid, and could not be applied as a film by the method of dipping. The 0.5 and 1.0% solutions were applied and the coated metal panels baked for one-half hour at 200° F. (93° C.), 300° F. (149° C.) and 400° F. (204° C.).

In order to test the extent of cure in the allotted time and the character of the resulting films, they were tested for solvent and water resistance. The solvent resistance test was conducted by placing a drop of methyl ethyl ketone on the film and allowing the ketone to soak in for 2 minutes. The treated spot was then tested to determine whether it would be scratched with a sharpened pencil point. In this manner variations from unchanged to completely soluble are easily ascertained. The ratings of the films are given in the table below according to designations of 1 to 10 wherein 1 is soluble, 4 is partly soluble, 7 is softened, and 10 is unchanged and insoluble.

Tests for water resistance were conducted by immersing the films in boiling distilled water for 30 minutes and observing the tendency toward whitening as well as any loss of adhesion. The results are also designated numerically in the table below. In the whitening scale, 1 means white (opaque), 4 is milky to white, 7 is hazy to milky, and 10 is no whitening. According to the adhesion scale, 1 means film removed, 4 is film loosened, 7 is blistering, and 10 is no loss of adhesion.

| Temperature, °F. | Percent Catalyst | | | | | |
|---|---|---|---|---|---|---|
| | 0.5 | | | 1.0 | | |
| | Solvent Resistance | Water Resistance | | Solvent Resistance | Water Resistance | |
| | | Whitening | Adhesion | | Whitening | Adhesion |
| 200 | 1 | 4 | 6 | 1 | 4 | 6 |
| 300 | 1 | 4 | 6 | 6 | 4 | 8 |
| 400 | 9 | 8 | 10 | 9 | 8 | 10 |

The foregoing results demonstrate that generally the time and/or temperature of baking was too low for best cure at the chosen catalyst concentration. Nevertheless, it will be noted that the half-hour baking at 400° F. gave very tight cure.

EXAMPLE III

Another stock solution was prepared containing 100 parts of Polyether E dissolved in 41.9 parts Cellosolve acetate, 74.9 parts methyl isobutyl ketone, and 49.9 parts of toluene. A catalyst solution was prepared containing 10% of m-benzene-disulfonic acid in n-butyl acetate. The catalyst solution was added to the polyether solution so that film-forming compositions were obtained containing 0.2, 0.5 and 1.0 parts of catalyst per 100 parts of Polyether E. Sheet steel test panels were dipped in the compositions, the dipped sheets dried briefly, and baked in an air oven at 300° F. and 400° F. for one-half hour. The coated sheets were subjected to tests for solvent and water resistance as described in Example II. The results are tabulated below.

| Temperature | | 300° F. | 400° F. |
|---|---|---|---|
| Percent Catalyst: | | | |
| 0.0 | Solvent Resistance | 1 | 1 |
| | Water Resistance: | | |
| | Whitening | 8 | 8 |
| | Adhesion | 6 | 8 |
| 0.2 | Solvent Resistance | 1 | 9 |
| | Water Resistance: | | |
| | Whitening | 6 | 8 |
| | Adhesion | 8 | 8 |
| 0.5 | Solvent Resistance | 4 | 9 |
| | Water Resistance: | | |
| | Whitening | 6 | 6 |
| | Adhesion | 8 | 8 |
| 1.0 | Solvent Resistance | 8 | 8 |
| | Water Resistance: | | |
| | Whitening | 6 | 6 |
| | Adhesion | 8 | 8 |

Films baked at 400° F. were also subjected to a flexibility test wherein coated sheet steel panels were bent 180° over a one-eighth inch mandrel and inspected for any signs of fracture in the film. All passed this test except the film containing no catalyst and thus was not cured.

EXAMPLE IV

A stock solution of Polyether E was prepared by dissolving 27.1 parts of the polyether in a mixture of 18 parts of Cellosolve acetate (ethylene glycol monoacetate), 33 parts of methyl isobutyl ketone and 21.9 parts of toluene. Based upon the weight of the polyether in separate portions of the stock solution, there was added 2% each of m-benzenedisulfonic acid, p-toluenesulfonic acid, and mixed alkanesulfonic acids wherein the alkane group contained 1 to 4 carbon atoms. The mixture containing the m-benzenedisulfonic acid gelled in 15 minutes. The other two mixtures remained fluid.

EXAMPLE V

A stock solution was prepared containing 26.2 parts of Polyether C and 11.3 parts of a heat-convertible phenolic resin (Monsanto's Resimene P-97) dissolved in 27.5 parts of xylene, 21.8 parts of Cellosolve acetate (ethylene glycol monoacetate), and 5.6 parts of n-butyl alcohol. Based upon the combined weights of polyether and phenolic resin, there was added to separate portions of the stock solution 0.5%, 1% and 2% of p-toluenesulfonic acid as a 20% solution in n-butyl acetate. Cold rolled sheet steel panels were dipped in the solutions containing the sulfonic acid curing agent, allowed to air dry for about one-half hour, and baked in an oven for 30 minutes at the temperatures noted in the table below. The extent of cure was determined by the test with methyl ethyl ketone described previously in Example II wherein numeral 10 indicates complete cure and lower numbers designate lesser extent of cure.

| Percent Catalyst | 300° F. | 350° F. | 400° F. |
|---|---|---|---|
| 0.5 | 10 | 10 | 10 |
| 1.0 | 6 | 10 | 10 |
| 2.0 | 4 | 9 | 10 |

EXAMPLE VI

A solution was prepared by dissolving 100 parts of Polyether D in 150 parts of a mixture of equal weights of xylene and Cellosolve acetate (ethylene glycol monoacetate). To the solution was added 2 parts of p-toluenesulfonic acid. A metal panel was coated with the composition and baked for one-half hour at 175° C. A hard glossy protective film was obtained.

I claim as my invention:

1. A process of resinifying glycidyl polyether of a dihydric phenol having a 1,2-epoxy equivalency greater than 1.0 and having as functional groups only epoxy and hydroxyl groups which comprises commingling said polyether with 0.1 to 5% by weight of a reactant consisting of a substituted hydrocarbon free of other substituent groups than one to three single members of the class consisting of sulfonic acid and sulfonyl halide groups, and permitting the resulting mixture to resinify and cure to a solid resinous product.

2. The solid resinous product obtained according to the process defined in claim 1.

3. A process of resinifying glycidyl polyether of 2,2-bis(4-hydroxyphenyl)propane having a 1,2-epoxy equivalency greater than 1.0 and having as functional groups only epoxy and hydroxyl groups which comprises commingling said polyether with 0.1 to 5% by weight of a reactant consisting of a substituted hydrocarbon free of other substituent groups than one to three single members of the class consisting of sulfonic acid and sulfonyl halide groups, and permitting the resulting mixture to resinify and cure to a solid resinous product.

4. The solid resinous product obtained according to the process defined in claim 3.

5. A process of resinifying glycidyl polyether of 2,2-bis(4-hydroxyphenyl)propane, which polyether contains a chain of alternating gylceryl and 2,2,-bis(4-phenylene)propane radicals separated by intervening ethereal oxygen atoms, has a 1,2-epoxy equivalency between 1.0 and 2.0 and having as functional groups only epoxy and hydroxyl groups, and has a molecular weight of about 1200 to 4000, which comprises thoroughly mixing said polyether with 0.1 to 5% by weight of a reactant consisting of a hydrocarbon having only one to three hydrogen atoms substituted with a member of the class consisting of sulfonic acid and sulfonyl halide radicals, and permitting the resulting mixture to resinify and cure to a solid resinous product.

6. The solid resinous product obtained according to the process defined in claim 5.

7. A process of resinifying glycidyl polyether of a dihydric phenol having a 1,2-epoxy equivalency between 1.0 and 2.0 and having as functional groups only epoxy and hydroxyl groups which comprises commingling said polyether with 0.1 to 5% by weight of an acidic reactant consisting of an aromatic polysulfonic acid containing as sole substituent on the aromatic hydrocarbon radical two to three sulfonic acid groups linked directly to separate nuclear carbon atoms, and immediately thereafter impinging the commingled mixture onto a surface as a film which is permitted to resinify and cure to a solid resinous product.

8. The process according to claim 7 wherein the aromatic polysulfonic acid is m-benzenesulfonic acid.

9. A process of resinifying glycidyl polyether of a dihydric phenol having a 1,2-epoxy equivalency greater than 1.0 and having as functional groups only epoxy and hydroxyl groups which comprises commingling said polyether with 0.1 to 5% by weight of a reactant consisting of a substituted hydrocarbon containing as sole substituent group from one to three single members of the class consisting of sulfonic acid and sulfonyl halide groups, and curing the commingled mixture to a solid resinous product by baking at a temperature of about 100° C. to 250° C.

10. The process according to claim 9 wherein the substituted hydrocarbon is p-toluenesulfonic acid.

11. The process according to claim 9 wherein the dihydric phenol is 2,2-bis(4-hydroxyphenyl)propane, and the polyether has a molecular weight of about 1200 to 4000.

12. A process of resinifying glycidyl polyether of 2,2-bis(4-hydroxyphenyl)propane having a 1,2-epoxy equivalency between 1.0 and 2.0 and having as functional groups only epoxy and hydroxyl groups which comprises commingling said polyether with 0.5 to 3% by weight of an acidic reactant consisting of a substituted hydrocarbon containing as sole substituent group from one to three sulfonic acid groups, and substantially completing the cure of the commingled mixture to a solid resinous product at about 100° C. to 250° C.

13. The process as defined in claim 12 wherein the substituted hydrocarbon is p-toluenesulfonic acid.

14. The process as defined in claim 12 wherein the substituted hydrocarbon is m-benzenedisulfonic acid.

15. The process as defined in claim 12 wherein the substituted hydrocarbon is methionic acid.

HANS DANNENBERG.

References Cited in the file of this patent

UNITED STATES PATENTS

| Number | Name | Date |
|---|---|---|
| 2,089,569 | Orthner | Aug. 10, 1937 |
| 2,258,546 | Dietz | Oct. 7, 1941 |
| 2,500,449 | Bradley | Mar. 14, 1950 |
| 2,575,440 | Bradley | Nov. 20, 1951 |

FOREIGN PATENTS

| Number | Country | Date |
|---|---|---|
| 583,471 | Great Britain | Dec. 19, 1946 |